US007003965B2

(12) United States Patent
Auer et al.

(10) Patent No.: US 7,003,965 B2
(45) Date of Patent: Feb. 28, 2006

(54) METHOD FOR DIRECTLY COOLING FINE-PARTICLE SOLID SUBSTANCES

(75) Inventors: Gerhard Auer, Krefeld (DE); Dirk Weber, Rheinberg (DE); Werner Schuy, Tönisvorst (DE); Frank Wittekopf, Tönisvorst (DE)

(73) Assignee: Kerr-McGee Pigments International GmbH, Zurich (CH)

( * ) Notice: Subject to any disclaimer, the term of this patent is extended or adjusted under 35 U.S.C. 154(b) by 88 days.

(21) Appl. No.: 10/482,909

(22) PCT Filed: Jul. 4, 2002

(86) PCT No.: PCT/DE02/02447

§ 371 (c)(1),
(2), (4) Date: Jan. 5, 2004

(87) PCT Pub. No.: WO03/004954

PCT Pub. Date: Jan. 16, 2003

(65) Prior Publication Data
US 2004/0237543 A1    Dec. 2, 2004

(30) Foreign Application Priority Data
Jul. 5, 2001    (DE) ............... 101 32 072
Jul. 5, 2001    (DE) ............... 101 32 073

(51) Int. Cl.
*F17C 9/02*    (2006.01)
*F17C 7/02*    (2006.01)
*F25D 13/06*    (2006.01)
*F25D 17/02*    (2006.01)

(52) U.S. Cl. ............... 62/50.2; 62/52.1; 62/63; 62/64

(58) Field of Classification Search .......... 62/50.2, 62/52.1, 63, 64
See application file for complete search history.

(56) References Cited

U.S. PATENT DOCUMENTS

| 3,330,046 | A | * | 7/1967 | Albertus ................. 34/363 |
| 3,350,046 | A | | 10/1967 | Kirk |
| 3,583,172 | A | * | 6/1971 | Koudelka et al. .......... 62/70 |
| 3,664,385 | A | | 5/1972 | Carter |
| 3,672,182 | A | * | 6/1972 | Stowasser et al. ......... 62/98 |
| 4,479,362 | A | * | 10/1984 | McWhorter et al. ........ 62/63 |
| 4,619,113 | A | * | 10/1986 | Dubrulle et al. ............ 62/64 |
| 4,913,063 | A | * | 4/1990 | Jonas et al. ............. 106/413 |
| 5,522,152 | A | | 6/1996 | Woolsey |
| 5,744,108 | A | * | 4/1998 | Holle et al. ................ 423/74 |

FOREIGN PATENT DOCUMENTS

| DE | 34 14 035 | 10/1985 |
| DE | 36 23 724 | 1/1988 |
| DE | 37 13 571 | 11/1988 |
| DE | 38 33 830 | 4/1990 |
| DE | 39 41 262 | 8/1991 |
| DE | 195 36 657 | 4/1997 |
| EP | 0 501 495 | 9/1992 |
| EP | 0 611 928 | 8/1994 |
| FR | 2 125 151 | 9/1972 |
| GB | 592 002 | 9/1947 |
| JP | 03-199272 | 8/1991 |

* cited by examiner

*Primary Examiner*—William C. Doerrler
(74) *Attorney, Agent, or Firm*—Collard & Roe, P.C.

(57) ABSTRACT

The invention relates to a method for directly cooling fine-particle, powdery solid substances by using a cooling medium provided in the form of low-boiling condensed gases or of cold gases obtained therefrom, whereupon bulk material packings are subsequently filled with these solid substances. The invention also relates to a device for directly cooling the fine-particle, powdery solid substances and to fine-particle, powdery solid substances, which are located inside bulk material packings and which, compared to air, have a lower oxygen content in the gas phase between the solid substance particles.

23 Claims, No Drawings

METHOD FOR DIRECTLY COOLING FINE-PARTICLE SOLID SUBSTANCES

CROSS REFERENCE TO RELATED APPLICATIONS

Applicants claim priority under 35 U.S.C. §119 of German Application Nos. 101 32 072.8 and 101 32 073.6 both filed on Jul. 5, 2001. Applicants also claim priority under 35 U.S.C. §365 of PCT/DE02/02447 filed Jul. 4, 2002. The international application under PCT article 21(2) was not published in English.

The invention relates to a method and a device for derectly cooling fine-particle, powder-form solid substances before they are filled into bulk material packaging.

Numerous fine-particle, powder-form solid substances are filled into bulk material packaging for the purpose of sale, transport, protection against ambient influences, or for the purpose of storage. Frequently, the temperature of the fine-particle, powder-form solid substances is too high, as a result of the production processes or processing processes, for them to be filled into the desired bulk material packaging without problems. Without sufficient cooling, this can therefore result in numerous problems or disadvantages, such as:

- severe wear of temperature-sensitive system parts such as rubber gaskets or pinch valves,
- damage to bulk material packaging, such as paper or plastic bags, due to an overly high temperature of the solid substances,
- low bulk weight of the solid substances at the time of packaging,
- poor de-aeration behavior during filling of the bulk material packaging and silo vehicles due to the comparatively high viscosity of the hot gas phase,
- low fill amount of bulk material packaging and silo vehicles,
- more time-consuming filling of bulk material packaging and silo vehicles,
- damage to bulk material packaging (e.g. paper bags) due to an overly high fill volume,
- great tendency to produce dust while filling the solid substances into bulk material packaging,
- optically unappealing appearance of bags and pallets,
- condensation effects within pallets that are shrink-wrapped,
- impairment of work safety during further handling (e.g. loading or transport) due to the hot surface of the bulk material packaging.

In this connection, the stated problems or disadvantages during filling of fine-particle, powder-form solid substances into bulk material packaging can occur both individually and in combination. Some of the stated problems or disadvantages are obvious, if hot solid substances must be handled and filled into bulk material packaging, others of the stated problems or disadvantages (such as low bulk weight, poor de-aeration behavior) are, however, specific for the handling and filling of very fine-particle, powder-form solid substances into bulk material packaging. In this sense, such powder-form solid substances are referred to as fine-particle in the present document if they have an average particle size of less than 50 $\mu$m, preferably less than 20 $\mu$m, but particularly if they have an average particle size of less than 5 $\mu$m, preferably less than 1 $\mu$m.

Bulk material packaging in the present document is understood to mean such packaging that is used for the purpose of sale, transport, protection against ambient influences, or for the purpose of long-term storage, for example paper or plastic bags, barrels, Big Bags, sacks, containers made of paper, paperboard, plastic, or other materials.

Fundamentally, such problems can occur when filling all fine-particle, powder-form solid substances into bulk material packaging, if they have a higher temperature due to the method of their production or processing, e.g. after calcinations, calcinations with subsequent grinding, drying, or any other high-temperature treatment, or in the case of a production method at a high temperature.

For example, this applies to cement, carbon black, or also to pigments pretreated in thermal manner, e.g. by means of calcinations, which must be filled into bulk material packaging. In particular manner, however, this applies to pigments ground by steam jet.

For the grinding of very fine-particle solid substances having particle sizes in the range of 1 $\mu$m or below, the technique of jet grinding is frequently used. Jet grinding is a kind of impact grinding in which the material being ground is accelerated in a fast gas stream and comminuted by means of rebounding against itself or against a rebound wall. In this connection, the grinding effect is decisively dependent on the impact velocity, i.e. the impact energy.

In the grinding of solid substances that require a particularly high introduction of energy or a particularly high degree of comminution in order to be comminuted or de-agglomerated, such as in the case of various inorganic pigments, the method of steam jet grinding using superheated steam as the grinding medium is generally used. A method for the production of titanium dioxide pigments, in which the titanium dioxide is subjected to steam jet grinding in a final step, is described in DE 195 36 657 A1. During steam jet grinding, the temperature of the pigment/gas mixture generally lies in the range of approximately 200 to 300° C. after it leaves the mill. After separation of the pigment from the steam by means of a dust precipitator or dust filter, the temperature of the bulk pigment, which still contains steam, typically still lies in the range of approximately 200 to 250° C. It is true that a certain cooling occurs as the result of intermediate storage in silos or during mechanical or pneumatic transport, but at the time of being filled into bags or other packaging, the pigments are frequently still at temperatures of about 100° C. or more. This can result in numerous problems or disadvantages, as already described above.

The cooling effect of fine-particle, powder-form solid substances by means of the addition of air at ambient temperature, e.g. during pneumatic transport of the fine-particle, powder-form solid substances, is limited because of the slight temperature difference and the low heat capacity of the air. This has the result that even when using large amounts of air, the temperature reduction is comparatively slight and accordingly, the disadvantages described above are only ameliorated to an insignificant extent.

It is true that a very large amount of air can cause a significant temperature reduction, but this method of procedure has significant disadvantages with regard to separation of the gas phase from the fine-particle, powder-form solid substances, as well as with regard to packaging properties and operating costs. Furthermore, the risk of contamination of the fine-particle, powder-form solid substances with moisture, dust, carbon dioxide, sulfur oxides or nitrogen oxides, traces of oil, or other contaminants from the air increases.

Convection cooling over an extended period of time is also disadvantageous because of the poor heat conductivity of most fine-particle, powder-form solid substances and accordingly, an unreasonably long period of occupation of bulk material containers. This can result in a significant reduction of production capacity.

DE 3 414 035 A1 describes the indirect cooling of a gas that contains dust, in which the gas is passed over regenerators filled with a heat storage mass. This or comparable methods for indirect cooling by means of cooling surfaces or heat exchangers is/are not very practical, since sizable heat transfer surfaces would have to be made available for this purpose. In the case of this method described in DE 3 414 035 A1, the dust load of the gases is furthermore very slight, at approximately 20 mg/m$^3$, and is not comparable with the usual solid substance/gas mixture ratios that are usual in pigment technology, for example, during the intended filling into bulk material packaging (frequently several kg/m$^3$). Experience has shown that with higher solid substance contents in the gas phase, the risk of caking to the cooling contact surfaces increases.

Cooling coils for indirectly cooling fine-particle, powder-form solid substances are used in various cases, but here again, the disadvantages in terms of caking, operational safety, and investment costs are significant.

DE 3713571 A1 describes a device for filling plastic bags with powder-form or granulated materials, wherein the filled bags are sealed and brought into a cooling zone, in order to guarantee the stability of the seal seam. Since the cooling described here only takes place after filling into bags, it is not suitable for avoiding the disadvantages stated above.

U.S. Pat. No. 3,664,385 describes mechanical compacting of powders for filling them into packaging, wherein a pulse of cooled air can also be used for eliminating dust. However, the cooling effect of such a pulse of cooled air is insufficient for achieving adequate compacting of fine-particle, powder-form solid substances, and for this reason, the powders also have to be compacted mechanically. Furthermore, this method is less suitable for fine-particle, powder-form solid substances having particular requirements with regard to dispersability and fineness, such as pigments, since the mechanical compacting brings with it the risk of agglomeration, and thereby the purpose aimed at with grinding can be partially eliminated again.

U.S. Pat. No. 4,619,113 describes direct cooling of detergent powder in a silo, using liquid nitrogen, in order to subsequently allow the addition of temperature-sensitive detergent powder additives.

Since the average particle size of the detergent powder to be cooled is 500 μm (column 1, lines 24–25), this method described in U.S. Pat. No. 4,619,113 does not provide any indication of the particular problems while filling very fine-particle, powder-form solid substances into bulk material packaging, nor of how to solve them.

DE 3941262 describes direct cooling of a powder-form substance, using liquid nitrogen, wherein the powder jet is scattered by means of mechanical installations before it makes contact with the liquid nitrogen. DE 3623724 A1 describes direct cooling of cement, using liquid nitrogen, wherein the cement is blown into the silo at the same time as the liquid nitrogen.

These methods described in DE 3941262 and DE 3623724 A1 have the sole purpose of simple cooling, not that of improving the filling properties for packaging in bulk material packaging. These references do not give any indication with regard to the specific requirements of very fine-particle, powder-form solid substances, nor do they give any indications with regard to the specific problems stated above and how to solve them, during the handling and filling of fine-particle, powder-form solid substances into bulk material packaging.

U.S. Pat. No. 3,350,046 describes the heat exchange between gases and fine-particle solid substances having a particle size of less than 50 μm, wherein a device consisting of several chambers, connected with one another, is used, through which the gas and solid substance stream takes place in opposite directions.

The system used for this purpose is complicated, and a large amount of cooling gas is needed. The method therefore has similar disadvantages as the cooling with large amounts of air that was described above. There are also no indications of the specific problems stated above and how to solve them, during the handling and filling of fine-particle, powder-form solid substances into bulk material packaging.

EP 611 928 A1, EP 501 495 A1, and DE 38 33 830 A1 describe direct cooling of material to be ground, using condensed gases having a low boiling point. This cooling takes place, however, before grinding, in order to optimize the actual grinding process by increasing the brittleness of the material to be ground, and accordingly does not lead to a solution of the problems described above.

The temperature reduction before grinding that is achieved by such cooling is generally lost again as a result of the heat development that is connected with grinding, so that no advantages exist any longer at the time of filling. There are also no indications of the specific problems stated above and how to solve them, during the handling and filling of fine-particle, powder-form solid substances into bulk material packaging.

Most of the methods mentioned are aimed at reducing obvious thermal consequential problems by means of various variants of cooling. However, there are no explicit indications of the specific requirements of fine-particle, powder-form solid substances, e.g. the very high requirements with regard to fineness and dispersability of pigments, and the related problems during filling into bulk material packaging.

It is therefore a disadvantage of the stated methods that they do not eliminate the problems described in the handling and filling of fine-particle, powder-form solid substances into bulk material packaging, or eliminate them only in part. This is particularly true for the pigment-specific problems that were described.

An aim was to make available a method that makes it possible to treat a hot, fine-particle, powder-form solid substance in such a manner that the disadvantages described above, in the handling of fine-particle, powder-form solid substances and their subsequent filling into bulk material packaging, are avoided entirely, or at least to a great extent.

It was furthermore an aim to use as low a gas volume as possible in the handling of the fine-particle, powder-form solid substances and their filling into bulk material packaging, in order to keep the expense and effort of separation of the gas and the removal of dust from it as low as possible.

In addition, it was an aim to make available a device with which cooling of a mixture consisting of a fine-particle, powder-form solid substance and a gas can be accomplished in simple and efficient manner.

In addition, it was an aim to produce fine-particle, powder-form solid substances located in bulk material packaging that have a lower proportion of oxygen in the gas phase between the solid substance particles, as compared with air.

The method according to the invention comprises directly cooling fine-particle, powder-form solids by adding a cooling medium and, subsequent to this, filling the ground material into bulk material packaging, wherein the cooling medium consists either of one or more different condensed gases having a low boiling point, or of a cold gas or gas mixture, which was produced using one or more different condensed gases having a low boiling point, or wherein the cooling medium consists of a cold gas or gas mixture that was pre-cooled using one or more different condensed gases having a low boiling point. This method is of particular significance for cooling and subsequent filling of fine-particle, powder-form solid substances into bulk material packaging, such as commercially available paper bags, plastic bags, sacks, barrels, or other small containers made of different materials. The method can also be advantageous for the filling of silo vehicles.

Any compounds that demonstrate an inert behavior with regard to the fine-particle, powder-form solid substances in question are suitable as a cooling medium. These can be, for example, noble gases, carbon dioxide, nitrogen, oxygen, or mixtures of the stated substances (e.g. air). Preferably, the cooling medium used for direct cooling is obtained by means of evaporation of condensed gases having a low boiling point. Liquid nitrogen, liquid air, or liquid carbon dioxide are particularly suitable. Solid carbon dioxide is also suitable, particularly if it is present in finely dispersed form.

In this connection, the cooling medium used for direct cooling preferably has a temperature of less than 0° C., preferably less than −20° C., particularly preferably less than −40° C., in order to achieve a significant cooling effect.

The temperature aimed at for the fine-particle, powder-form solid substances to be cooled, i.e. the solid-substance-containing mixture to be cooled is, of course, dependent on the type of solid substances and the quality demands made on it. Preferably, the type and amount of the cooling medium is selected in such a way that the fine-particle, powder-form solid substances to be cooled are cooled by at least 20° C., preferably by at least 50° C. Cooling by means of the direct cooling to a maximum of 100° C., and in particular to a maximum of 70° C., is preferred.

Preferably, the cooling medium used for direct cooling contains less than 0.0001 parts by mass water. In this way, the dew point of the solid substance/gas mixture can be lowered, thereby resulting in a reduced tendency of the solid substances to form agglomerates. For example, the dew point in the solid substance bulk material can be advantageously lowered by using liquid nitrogen with its extremely low content of water.

Cooling of the fine-particle, powder-form solid substances can fundamentally take place at different points of the production process or processing process, for example directly after thermal treatment of the powder-form solid substances, in transport lines, or directly before filling into bulk material packaging.

The method according to the invention is particularly practical if the fine-particle, powder-form solid substances are produced or processed at high temperatures because of conditions of process technology or logistical requirements, and the temperature can be lowered by means of convection cooling or cooling with air only to an insufficient degree, so that conventional filling into bulk material packaging brings significant problems with it.

Examples of processes in which the cooling according to the invention can have an advantageous effect:

direct cooling and packaging of fine-particle, powder-form solid substances subsequent to thermal drying and, if applicable, grinding, direct cooling and packaging of fine-particle, powder-form solid substances subsequent to calcination and, if applicable, grinding, direct cooling and packaging of fine-particle, powder-form solid substances subsequent to a pyrrolytic production process or a combustion process, direct cooling and packaging of fine-particle, powder-form solid substances subsequent to steam jet grinding.

It has been shown that in the case of fine-particle, powder-form solid substances having an average particle size of <50 $\mu$m, preferably <20 $\mu$m, but particularly in the case of very fine-particle, powder-form solid substances having an average particle size of <5 $\mu$m, particularly preferably <1 $\mu$m, the rheological properties, i.e. the handling properties are clearly dependent on their temperature. Thus, for example, the bulk weight of fine-particle, powder-form solid substances that are filled into the packaging usually used, such as bags, barrels, Big Bags, or silos, at a low temperature, is significantly greater in comparison with the same product that is filled into this packaging at a higher temperature.

The fine-particle, powder-form solid substances to be cooled and packaged can be, for example, titanium dioxide, iron oxide, chromium oxide, photo-resistant pigments, colored pigments, metal pigments, magnetic pigments, carbon blacks, or cement.

Also, the fine-particle, powder-form solid substances to be packaged can be temperature-sensitive compounds or solid substances coated with temperature-sensitive compounds.

The direct cooling according to the invention, using a cooling medium, can take place, for example, in that the cooling medium is metered into a transport line for pneumatic transport of the fine-particle, powder-form solid substances. It can be advantageous to meter the cooling medium in at several different locations, in order to achieve particularly great temperature reductions. In this manner, the cooling medium can also make a significant contribution to the pneumatic transport, if applicable. Injection of the cooling medium into a transport line can take place both in the flow direction and counter to the flow direction, depending on whether strong or slight swirling of the cooling medium is aimed at.

The device for direct cooling according to the invention consists of a supply container for condensed gas having a low boiling point, an insulated connecting line between the supply container and the transport line for pneumatic transport of the fine-particle, powder-form solid substances, a nozzle for introduction of the condensed gases having a low boiling point into the transport line, and a control and regulation device.

This method of direct cooling according to the invention has the advantages, as compared with the method of indirect cooling by way of contact surfaces, that no large contact surfaces for heat transfer are required. In addition, cooling takes place significantly more rapidly than in the case of indirect cooling, which is particularly advantageous if the ground material in question is temperature-sensitive, or if great temperature reductions are aimed at within a short period of time.

In contrast, in the case of indirect cooling, there is the risk of local condensation because of the comparatively great temperature gradients in the material to be cooled, particularly in the region of the cooling surfaces.

The advantage of the method according to the invention as compared with cooling using large amounts of air at the ambient temperature is, for one thing, that a significantly more rapid and stronger cooling effect can be achieved by means of direct cooling using condensed gases having a low boiling point, because of their evaporation enthalpy. For another thing, a lesser volume of gas phase is required in the method according to the invention, which significantly simplifies the separation of the gas phase from the fine-particle, powder-form solid substances before or during filling into bulk material packaging. In addition, the expense and effort for removing dust from the gases is significantly reduced.

Aside from this, contamination of the fine-particle, powder-form solid substances with moisture, dust, carbon dioxide, sulfur oxides or nitrogen oxides, traces of oil, or other contaminants from the air is reduced or avoided; particularly in the case of a basic surface of the fine-particle, powder-form solid substances (e.g. after chemical treatment with corresponding compounds), undesirable neutralization of the surface by the acid components in the air can occur when using large amounts of air.

Finally, the residual moisture of the fine-particle, powder-form solid substances is reduced by means of the cooling medium, which is generally very dry and has a high absorption capacity for moisture.

Although the cryogenic cooling of fine-particle, powder-form solid substances by means of condensed gases having a low boiling point is characterized by relatively high costs for the cooling medium, this effect is surprisingly overcompensated by a whole number of advantages of this method of procedure, at a closer look. For example, because of the lower temperature of the solid substance/gas mixture, and because of the lower specific gas proportion (with reference to the solid substance), the following advantages can result:
- less wear of temperature-sensitive system parts such as rubber gaskets,
- less damage to temperature-sensitive bulk material packaging, such as paper or plastic bags, due to a lower temperature of the fine-particle, powder-form solid substances to be packaged,
- because of less thermal stress, the possibility of using less expensive packaging,
- greater bulk weight of the fine-particle, powder-form solid substances at the time of packaging,
- better de-aeration behavior during filling of the bulk material packaging and silo vehicles due to the lower viscosity of the gas phase,
- higher fill amount of bulk material packaging and silo vehicles,
- faster filling of bulk material packaging and silo vehicles,
- less damage to bulk material packaging (e.g. paper bags) due to an overly high fill volume,
- less tendency to produce dust while filling the fine-particle, powder-form solid substances into bulk material packaging,
- less gas volume during pneumatic transport or cooling; therefore smaller filter area for removing dust from the gas, i.e. higher filling capacity at a constant filter area,
- optically more appealing appearance, for example of bags and pallets,
- less moisture in the product due to absorption capacity of the cooling medium,
- less condensation within pallets that are shrink-wrapped,
- improvement of work safety, due to the lower temperature of the packaged fine-particle, powder-form solid substances, during further handling (e.g. loading or transport).

The method according to the invention for cooling fine-particle, powder-form solid substances has the result not only of a lower proportion of defective batches, such as burst bags, but also has reliable operation, an increased capacity of packaging devices, as well as a reduced tendency to produce dust, as additional advantages, and results in a more appealing optical appearance of individual bags or pallets.

The method according to the invention is particularly suitable for directly cooling inorganic or organic pigments and their subsequent filling into bulk material packaging, because particularly great demands with regard to dispersability or fineness are often made with regard to these pigments and, at the same time, the rheological properties, i.e. the handling of the ground pigments, are of particular importance.

The specific advantages of the method according to the invention, in the case of use for pigments, are that significant demands with regard to the pigments, such as good dispersability, good optical properties, and good handling of the ground pigments during filling into bulk material packaging can be fulfilled at the same time. Specifically the rheological properties, i.e. the handling properties of pigments, are greatly dependent on their temperature. Thus, for example, the bulk weight of pigments that are filled into the packaging normally used, such as bags, barrels, Big Bags, or silos, is significantly greater in comparison with the same product that was filled into this packaging at a higher temperature.

In the case of steam jet grinding of pigments, cooling of the ground material can [take place] directly behind the steam jet mill, after a separation device such as a dust filter or a dust precipitator in the transport line, or directly before filling into bulk material packaging. It can be advantageous if the cooling medium is only added when the partial steam pressure of the gas phase of the ground material already has sufficiently low values, for example due to partial exchange or dilution of the steam by air, in order to avoid going below the dew point as a result of the direct cooling.

It is preferred if after steam jet grinding, part of the gas phase that contains steam is first removed from the ground pigments, and subsequently the ground pigments are cooled by means of direct cooling, using a cooling medium. This removal of part of the gas phase that contains steam takes place, for example, using a dust precipitator and/or a dust filter.

The method according to the invention is particularly well suited for titanium oxide pigments, because of the strong influence of the temperature on parameters such as the bulk weight during packaging. The method according to the invention proves to be particularly advantageous for those titanium oxide grades that are used for coloring plastics or for dispersion paints, and have a particularly low bulk weight because of their specific composition. In this manner, alternative methods such as granulation or pelleting can be eliminated.

Also, in the case of organically coated pigments, a detrimental influence on the tendency of organic additives on the pigment surface (grinding aids) to decompose can easily result from high temperatures, and this can have a particularly detrimental effect on the color tone. This is also avoided by the method according to the invention.

The method according to the invention is particularly advantageous if several steam jet mills are operated in parallel, and if the high throughput of pigment achieved in this manner can be lowered in temperature only inadequately by means of convection cooling or other conventional methods.

The method according to the invention is also well suited for iron oxide pigments. The advantages here are similar to those for titanium dioxide pigments, for one thing. In the case of iron oxide pigments that can be oxidized, e.g. iron oxide pigments in the magnetite modification, there is the additional factor that the tendency to oxidize in the course of processing and storage can be prevented by means of the partial or extensive displacement of oxygen in the air by the cooling medium, when using non-oxidizing gases such as $CO_2$ or $N_2$ as the cooling medium. In addition, the reactivity of these pigments with regard to residual portions of oxygen in the air is clearly reduced by the low temperatures that can be achieved by means of the method according to the invention, during packaging in bags.

Using the method according to the invention, it is therefore possible in all cases to comminute even those pigments that usually cannot be ground by means of steam jet grinding, using this decidedly effective grinding technique.

The materials obtained according to the invention and stored in bulk material packaging preferably have less than 20 wt.-% oxygen in the gas phase between the solid substance particles, particularly preferably less than 15 wt.-% oxygen, i.e. a mass ratio of nitrogen to oxygen of more than 4, preferably more than 5.7.

Since fine-particle, powder-form solid substances can demonstrate a clearly different rheological behavior, depending on their specific composition, a targeted influence on the transport properties can be undertaken by means of a suitable selection of the addition of the cooling medium and therefore of the temperature. Depending on the type of solid substance, cooling ahead of the pneumatic or mechanical transport or only after transport can be more advantageous. Also, cooling that does not occur until immediately before filling into bulk material packaging can be advantageous.

A preferred embodiment of the invention consists of cooling the transport air used for pneumatic transport and undertaking direct cooling of the fine-particle, powder-form solid substances using this cold transport air as the cooling medium. In this connection, the temperature of the transport air can take place, for example, using a heat exchanger or by means of the direct feed of condensed gases having a low boiling point or of solid carbon dioxide into the transport air. In this connection, cooling of the transport air by means of a heat exchanger can take place according to any method known to a person skilled in the art. It is particularly advantageous in this method of procedure that here, indirect cooling takes place on a gas that is free of solid substances, and that the solid substance/gas mixture is cooled directly.

Cooling of the transport air used for the pneumatic transport, before contact with the fine-particle, powder-form solid substance to be cooled, can be more advantageous, in terms of process technology, than cooling of a gas that contains solid substances, such as that formed after the transport air has been mixed with the fine-particle, powder-form solid substances to be transported.

It is also possible to combine the variants that have been described with one another. For example, both cooling of the transport air (directly or indirectly) and direct cooling of the solid substance/gas mixture with this air can take place, as well as, in addition, direct cooling of the solid substance/gas mixture (e.g. with condensed gases having a low boiling point).

Independent of the type of the cooling medium, the possibility of targeted control and regulation of the total process with regard to temperature-dependent parameters is particularly advantageous in the method of directly cooling fine-particle, powder-form solid substances, according to the invention. For example, by regulating the amount or the temperature of the cooling medium that is added, an optimal and constant temperature of the fine-particle, powder-form solid substances can be adjusted as a function of the product, and thereby the transport properties, for example, or the properties during filling of bulk material packaging, can be controlled in targeted manner, optimized, and kept constant.

Filling of the fine-particle, powder-form solid substances into paper or plastic bags usually takes place by way of a filling silo, using solid substance transport systems. At temperatures of 60° C. and higher, the use of inexpensive plastic bags (e.g. made of polyethylene or polypropylene) is generally eliminated. Only special and expensive plastic bags having a high temperature stability can be used for this purpose.

Using the method according to the invention, however, it is possible to use inexpensive polyethylene or polypropylene bags instead of these expensive plastic bags. Generally, cooling to temperatures in the range of 60° C. or below is required for this.

The use of inexpensive paper bags having a lesser stability, or of paper bags with a plastic lining, or plastic components in the closure region, also becomes possible using the method according to the invention.

The method according to the invention also allows the use of other packaging, which is not resistant to the temperatures that occur according to the state of the art, e.g. Big Bags made from plastics having a lesser thermal resistance, or other temperature-sensitive plastic packaging.

EXAMPLE 1

A titanium dioxide pigment produced according to the state of the art, subsequently treated, and dried, is micronized in a steam jet mill.

The product/steam ratio is 1:2.2 parts by weight. The temperature of the steam is 260° C. As transport air, approximately 100 m³ per metric ton of $TiO_2$ are introduced into the steam jet mill, together with the pigment to be ground. The temperature of the pigment/gas mixture after steam jet grinding is approximately 230° C.; after separation of the pigment from the gas phase, using a dust separator, the temperature of the bulk pigment, which still contains steam, is approximately 180° C. The water content of the gas phase is approximately 95 wt.-%, the water content of the gas phase with reference to $TiO_2$ is approximately 0.2 wt.-% at a bulk density of the $TiO_2$ of 0.5 g/cm³. After interim storage in a silo, the bulk pigment that still contains steam is pneumatically transported to the bagging machine. The amount of dried transport air is 75 m³ per metric ton of $TiO_2$. By way of a nozzle, 97 L liquid nitrogen per metric ton of TiO2 are introduced into the transport line. The temperature of the titanium dioxide/gas mixture is lowered from 110° C. to 60° C. in this manner. Afterwards, the water content of the gas phase amounts to approximately 1 wt.-%, the water content of the gas phase with reference to $TiO_2$ is approximately 0.2 wt.-%. Removal of the gas phase from the $TiO_2$ takes place in the filling silo from which the bags are filled. The temperature of the bulk pigment that contains gas is 60° C. at the time of filling into paper bags. The composition of the gas phase between the $TiO_2$ particles in the paper bags is: 87 wt.-% $N_2$, 12 wt.-% $O_2$. The water content of the gas phase with reference to $TiO_2$ is calculated as being less than 0.01 wt.-%. Independent of this, the $TiO_2$ has about 0.3 wt.-% adsorbed water.

The filling and de-aeration behavior during filling of the bags is good, because of the high bulk weight of the bulk pigment that contains gas. As a consequence of this, the pallets demonstrate an optically appealing appearance.

EXAMPLE 2

A titanium dioxide pigment for coloring plastics, produced according to the state of the art, subsequently treated, and dried, is micronized in a steam jet mill with the addition of 1 wt.-% of a silicon oil. The remainder of the process, up to filling into bags, takes place analogous to Example 1.

In contrast to Example 1, however, filling takes place into commercially available polypropylene bags. Because of the low temperature of the bulk pigment that contains gas (60° C.) at the time of filling into the polypropylene bags, no damage to the bags occurs.

The filling and de-aeration behavior during filling of the bags is good, because of the comparatively high bulk weight of the bulk pigment that contains gas. As a consequence of this, the pallets demonstrate an optically appealing appearance.

The pigment is particularly well suited for coloring plastics. It is possible to use the pigment, together with the packaging, directly in the processing process.

EXAMPLE 3

A titanium dioxide pigment produced according to the state of the art and subsequently treated with a total of 15 wt.-% of $SiO_2$ and $Al_2O_3$ (with reference to $TiO_2$), and dried, is micronized in a steam jet mill. The remainder of the process takes place analogous to Example 1.

The filling and de-aeration behavior during filling of the bags is good, because of the comparatively high bulk weight of the bulk pigment that contains gas. As a consequence of this, the pallets demonstrate an optically appealing appearance. The pigment is particularly suitable for the production of dispersion paints.

EXAMPLE 4

An iron oxide pigment ($Fe_2O_3$) produced according to the state of the art, by means of calcination, from magnetite, is micronized in a steam jet mill. The product/steam ratio is 1:2 parts by weight. The temperature of the steam is 260° C. The remainder of the process takes place analogous to Example 1.

The filling and de-aeration behavior during filling of the bags is good, because of the high bulk weight of the bulk pigment that contains gas. Also, it is possible to fill the product into conventional polyethylene or polypropylene bags, because of the low temperature (60° C.) of the bulk pigment that contains gas.

EXAMPLE 5

A nickel rutile yellow pigment produced according to the state of the art is ground in a Raymond mill. After interim storage in a silo, the bulk pigment is pneumatically transported to a bagging machine. By way of a nozzle, an amount of liquid nitrogen is introduced into the transport line so that the temperature of the bulk pigment that contains gas is 60° C. at the time of filling into bags.

The filling and de-aeration behavior during filling of the bags is good, because of the high bulk weight of the bulk pigment that contains gas. Also, it is possible to fill the product into conventional polyethylene or polypropylene bags, because of the low temperature (60° C.) of the bulk pigment that contains gas.

EXAMPLE 6

A furnace carbon black produced according to the state of the art is separated from the gas phase by way of a dust filter, and put into a silo for interim storage. From there, the carbon black is pneumatically transported to a bagging machine. By way of a nozzle, an amount of liquid nitrogen is introduced into the transport line so that the temperature of the bulk carbon black that contains gas is 60° C. at the time of filling into bags.

The filling and de-aeration behavior during filling of the bags is good, because of the high bulk weight of the bulk carbon black that contains gas. Also, it is possible to fill the product into conventional polyethylene or polypropylene bags, because of the low temperature (60° C.) of the bulk carbon black that contains gas.

EXAMPLE 7

A magnetite pigment ($Fe_3O_4$) produced according to the state of the art is ground in a steam jet mill. After extensive removal of the gas phase, using a dust separator or dust filter, and interim storage in a silo, the bulk pigment is pneumatically transported to a bagging machine, using nitrogen as the transport gas. By way of a nozzle, an amount of liquid nitrogen is introduced into the transport line so that the temperature of the bulk pigment that contains gas is a maximum of 30° C. at the time of filling into bags.

The filling and de-aeration behavior during filling of the bags is good, because of the high bulk weight of the bulk pigment that contains gas. Also, the reactivity with regard to residual proportions of oxygen is prevented because of the low filling temperature.

The steam-jet-ground magnetite has an excellent fineness and dispersability.

EXAMPLE 8

Comparison Example

A titanium dioxide pigment produced according to the state of the art, subsequently treated, and dried, is micronized in a steam jet mill.

The product/steam ratio is 1:2.2 parts by weight. The temperature of the steam is 260° C. As transport air, approximately 100 m³ per metric ton of $TiO_2$ are introduced into the steam jet mill, together with the pigment to be ground. The temperature of the pigment/gas mixture after steam jet grinding is approximately 230° C.; after separation of the pigment from the gas phase, using a dust separator, the temperature of the bulk pigment, which still contains steam, is approximately 180° C. The water content of the gas phase is approximately 95 wt.-%, the water content of the gas phase with reference to $TiO_2$ is approximately 0.2 wt.-% at a bulk density of the $TiO_2$ of 0.5 g/cm³. After interim storage in a silo, the bulk pigment that still contains steam is pneumatically transported to the bagging machine. The amount of transport air is 150 m³ per metric ton of $TiO_2$. Afterwards, the water content of the gas phase amounts to approximately 1 wt.-%, the water content of the gas phase with reference to $TiO_2$ is approximately 0.2 wt.-%. Removal of the gas phase from the $TiO_2$ takes place in the filling silo from which the bags are filled. The temperature of the bulk pigment that contains gas is 110° C. at the time of filling into paper bags. The composition of the gas phase between the $TiO_2$ particles in the paper bags is: 76 wt.-% $N_2$, 23 wt.-% $O_2$.

The filling and de-aeration behavior during filling of the bags is poor, because of the low bulk weight of the bulk pigment that contains gas. As a consequence of this, the pallets demonstrate an optically unappealing appearance.

Filling into commercially available polyethylene or polypropylene bags is not possible, because of the high temperature.

EXAMPLE 9

Comparison Example

A titanium dioxide pigment produced according to the state of the art, subsequently treated, and dried, is micronized in a steam jet mill.

The product/steam ratio is 1:2.2 parts by weight. The temperature of the steam is 260° C. As transport air, approximately 100 m³ per metric ton of TiO₂ are introduced into the steam jet mill, together with the pigment to be ground. The temperature of the pigment/gas mixture after steam jet grinding is approximately 230° C.; after separation of the pigment from the gas phase, using a dust separator, the temperature of the bulk pigment, which still contains steam, is approximately 180° C. After brief interim storage in a silo, the bulk pigment that still contains steam is pneumatically transported to the bagging machine. In order to achieve sufficient cooling of the titanium dioxide, 730 m³ transport air per metric ton of TiO₂ are used.

Removal of the gas phase from the TiO₂ takes place in the filling silo from which the bags are filled. The temperature of the bulk pigment that contains gas is 60° C. at the time of filling into paper bags.

The removal of the gas phase is time-consuming, because of the high amount of gas. Only significantly less titanium oxide can be transported and packaged per time unit, if no appropriately enlarged filter areas are made available for removing dust from the transport gas.

What is claimed is:

1. Method for directly cooling a fine-particle, powder-form solid substance of elevated temperature by means of introducing a cooling medium consisting of
   a) one or more different condensed gases having a low boiling point, or
   b) a cold gas or gas mixture, which was produced using one or more different condensed gases having a low boiling point, or
   c) a cold gas or gas mixture that was pre-cooled using one or more different condensed gases having a low boiling point, into the solid substance having an average particle size of less than 50 μm of an inorganic or organic pigment or of cement or of a solid coated with a temperature-sensitive compound, and subsequently filling the cooled solid substance into bulk material packaging or mobile bulk material containers.

2. Method according to claim 1, wherein the particle size is less than 20 μm.

3. Method according to claim 2, wherein the fine-particle, powder-form solid substances has an average particle size of less than 5 ∞m.

4. Method according to claim 1, wherein the fine-particle, powder-form solid substances is ground before the process step of direct cooling.

5. Method according to claim 4, wherein the fine-particle, powder-form solid substance is a pigment directly cooled between a process step of steam jet grinding and the process step of filling into bulk material packaging or mobile bulk material containers, by the addition of the cooling medium.

6. Method according to claim 5, wherein a mixture of ground pigment and gas phase that contains steam, is present immediately after the steam jet grinding, part of the gas phase that contains steam is first removed from the ground pigment, using a dust separator or a dust filter, and subsequently the ground pigments are cooled by means of direct cooling, using the cooling medium.

7. Method according to claim 1, wherein the cooling medium used for direct cooling has a temperature of less than 0° C.

8. Method according to claim 1, wherein the fine-particle, powder-form solid substances are transported pneumatically for filling into bulk material packaging or mobile bulk material containers, and that the gas used for the pneumatic transport is used as the cooling medium for direct cooling, the gas being cooled either indirectly in a heat exchanger, by means of condensed gases having a low boiling point, or directly, by injection of one or more different condensed gases having a low boiling point, before contact with the fine-particle, powder-form solid substances.

9. Method according to claim 8, wherein the cooling medium is metered into the transport line in the pneumatic transport of the fine-particle, powder-form solid substances.

10. Method according to claim 1, wherein gaseous nitrogen or gaseous carbon dioxide is used as the cooling medium.

11. Method according to claim 1, wherein liquid nitrogen or liquid or solid carbon dioxide is used as the cooling medium.

12. Method according to claim 1, wherein the fine-particle, powder-form solid substance is cooled within the short period of time that is required for mixing with the cooling medium, by at least 20° C.

13. Method according to claim 1, wherein the fine-particle, powder-form solid substance is cooled to a maximum of 100° C.

14. Method according to claim 8, wherein the cooling medium is introduced into the transport gas for the pneumatic transport of the fine-particle, powder-form solid substance before the transport gas makes contact with the solid substance.

15. Method according to claim 1, wherein the cooling medium used for direct cooling contains less than 0.0001 parts by mass water, and that the dew point of the gas phase that contains solid substance is lowered in this manner.

16. Method according to claim 1, wherein the fine-particle, powder-form solid substance is filled into bulk material packaging, after cooling has taken place, or filled into a silo vehicle.

17. Method according to claim 1, wherein the solid substance has the cooling medium applied to it, and is filled into bulk material packaging, in such a manner that in the bulk material packaging, the gas phase between the pigment particles contains less than 20 wt.-% oxygen.

18. Method according to claim 1, wherein the solid substance has the cooling medium applied to it, and is filled into bulk material packaging, in such a manner that in the bulk material packaging, the gas phase between the pigment particles contains a mass ratio of nitrogen to oxygen of more than 4.

19. Device for implementing the method according to claim 1, wherein the direct cooling of the fine-particle, powder-form solid substance takes place after steam-jet grinding, comprising a supply container for a condensed gas having a low boiling point, an insulated connecting line between the supply container and the transport line for pneumatic transport of the solid substance, a nozzle for introduction of the condensed gas having a low boiling point into the transport line, and a control and regulation device, wherein a steam jet mill and a separation device arranged after the steam jet mill and ahead of a packaging device, in the transport direction, which separates the solid and the steam, are assigned to the feed line.

20. Method according to claim 1, wherein the pigment is selected from the group consisting of titanium dioxide, iron oxide, chromium oxide, a photo-resistant pigment, a colored pigment, a metal pigment, a magnetic pigment, and carbon black.

21. Method according to claim 7, wherein the temperature is less than −40° C.

22. Method according to claim 12, wherein the solid substance is cooled by at least 50° C.

23. Method according to claim 13, wherein the solid substance is cooled to less than 60° C.

* * * * *